United States Patent [19]

Nakashima

[11] Patent Number: 5,577,569
[45] Date of Patent: Nov. 26, 1996

[54] VEHICLE SAFETY DEVICE

[75] Inventor: Shogo Nakashima, Himeji, Japan

[73] Assignee: Mitsubishi Denki Kabushiki Kaisha, Tokyo, Japan

[21] Appl. No.: 309,154

[22] Filed: Sep. 20, 1994

[30] Foreign Application Priority Data

Oct. 8, 1993 [JP] Japan .................. 5-253071

[51] Int. Cl.⁶ ................................. B60K 1/00
[52] U.S. Cl. .............. 180/169; 180/65.1; 180/65.8; 180/277; 180/279
[58] Field of Search ................. 180/169, 170, 180/65.1, 65.8, 274, 279, 167, 168, 275, 277, 131; 318/587; 340/438, 439, 459, 936; 364/424.01, 424.02, 426.01, 426.04; 293/4

[56] References Cited

U.S. PATENT DOCUMENTS

| | | | |
|---|---|---|---|
| 5,036,935 | 8/1991 | Kohara | 180/279 |
| 5,048,637 | 9/1991 | Lomasney | 180/279 |
| 5,327,990 | 7/1994 | Busquets | 180/279 |

*Primary Examiner*—Richard M. Camby
*Attorney, Agent, or Firm*—Sughrue, Mion, Zinn, Macpeak & Seas

[57] ABSTRACT

A vehicle safety device designed to reliably prevent uncontrolled travel or runaway of a vehicle when a collision accident occurs. A breaker is connected in a current path between a battery and a controller. In a processing section of a distance measuring unit, a time difference between the moment at which a laser light emitting section emits light and the moment at which a laser light receiving section receives light is detected and the distance and the relative speed between the vehicle and an object against which the vehicle may collide are calculated. When the distance between the vehicle and the object becomes zero while the relative speed between the vehicle and the object is larger than a predetermined value, the processing section determines that a collision has occurred, and supplies a control signal to the breaker to open the same.

3 Claims, 4 Drawing Sheets

VEHICLE SAFETY DEVICE

BACKGROUND OF THE INVENTION

1. Field of the Invention

This invention relates to a vehicle safety device suitably used for, for example, electric vehicles.

2. Description of the Related Art

FIG. 4 is a diagram of the configuration of a conventional vehicle safety device used, for example, in a power circuit of an electric propulsion system for an electric vehicle.

Referring to FIG. 1, a battery 1 is provided as a power source for driving the electric vehicle. The positive terminal of the battery 1 is connected to a controller 3 through a fuse 2 for preventing a short-circuit accident, while the negative terminal of the battery 1 is connected directly to the controller 3. The controller 3 supplies driving current to an alternating current motor 4 for the controlled driving thereof. The alternating current motor 4 is connected to a drive mechanism (not shown) for driving the vehicle.

The operation of this system will be described below.

A current supplied from the battery 1 flows through the fuse 2 into the controller 3. The current is controlled by the controller 3 and then flows into the alternating current motor 4 to generate a driving force in the alternating current motor 4. The vehicle drive mechanism is driven by the driving force of the alternating current motor 4.

When a short-circuit occurs in the power circuit, the fuse 2 is melted and cut by a large current to break the current path between the battery 1 and the controller 3 to maintain safety.

In the conventional vehicle safety device thus constructed, the power circuit is not cut off even when a vehicle collision occurs, unless a short-circuit occurs in the electric circuit. Upon such a collision, if a failure occurs in the controller 3 or an accelerator device (not shown) or if a driver in an unconscious state depresses the accelerator pedal, an electric current is supplied to the alternating current motor 4. There is therefore a risk of the vehicle running away.

SUMMARY OF THE INVENTION

In view of this problem, an object of the present invention is to provide a vehicle safety device capable of reliably preventing a runaway of a vehicle such as an electric vehicle at the time of occurrence of a collision accident or the like.

To achieve this object, according to one aspect of the present invention, there is provided a safety device for a vehicle in which a driving force is transmitted from a power unit to road wheels through a power transmission path, said safety device comprising collision detecting means for detecting a collision of the vehicle with an object and generating a corresponding output signal, and cutting means provided in a power transmission path between said power unit and said road wheels for cutting off said power transmission path in response to the output signal from said collusion detecting means.

At the time of occurrence of a collision accident, the current path between the driving power source and the controller is cut to interrupt the power supply to the electric motor, thereby reliably preventing uncontrolled speeding of the vehicle.

DESCRIPTION OF THE PREFERRED EMBODIMENTS

EMBODIMENT 1

Figure 1:
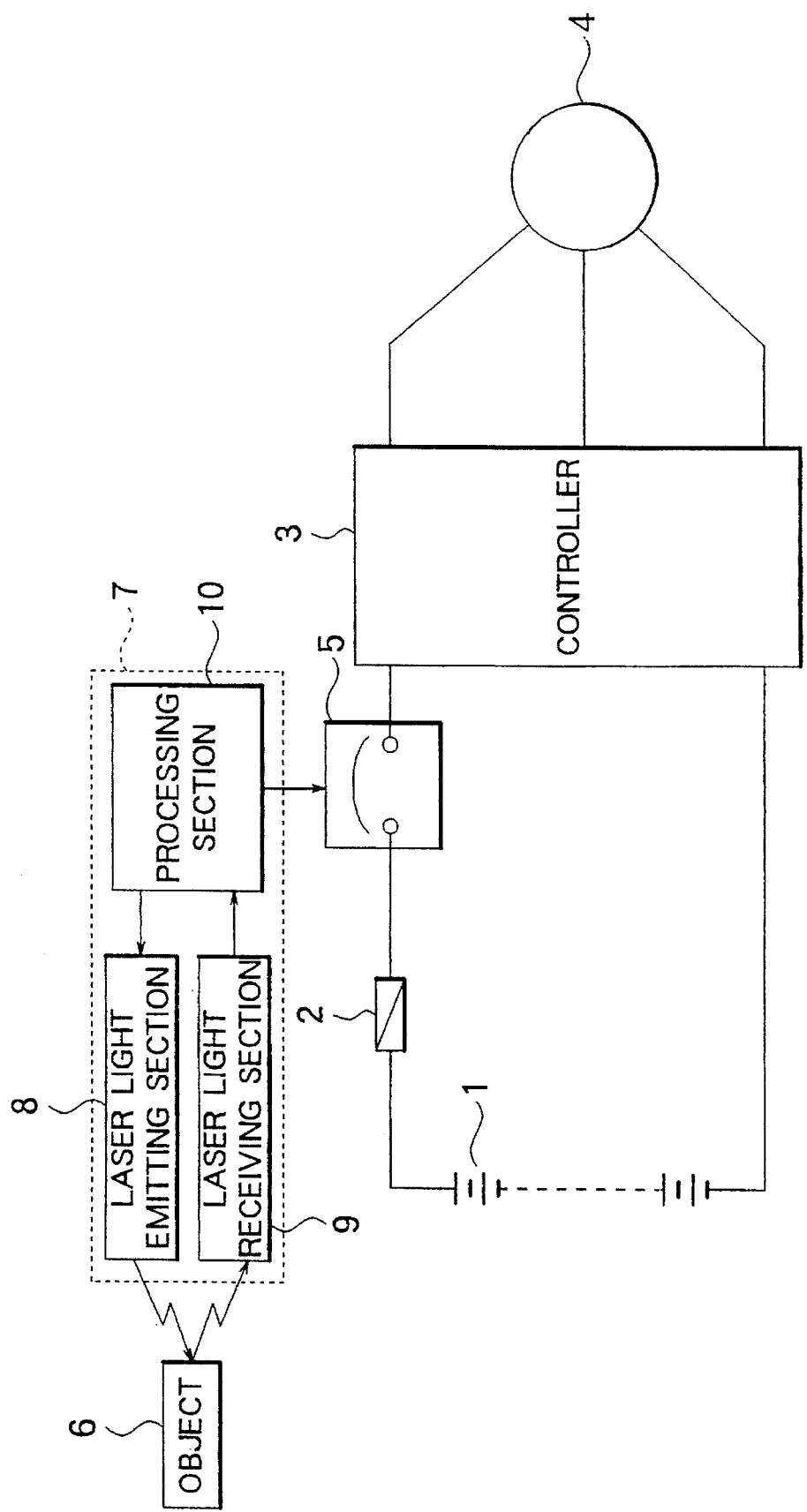
FIG. 1 is a diagram of the configuration of an embodiment of a vehicle safety device in accordance with the present invention.
Figure 4:
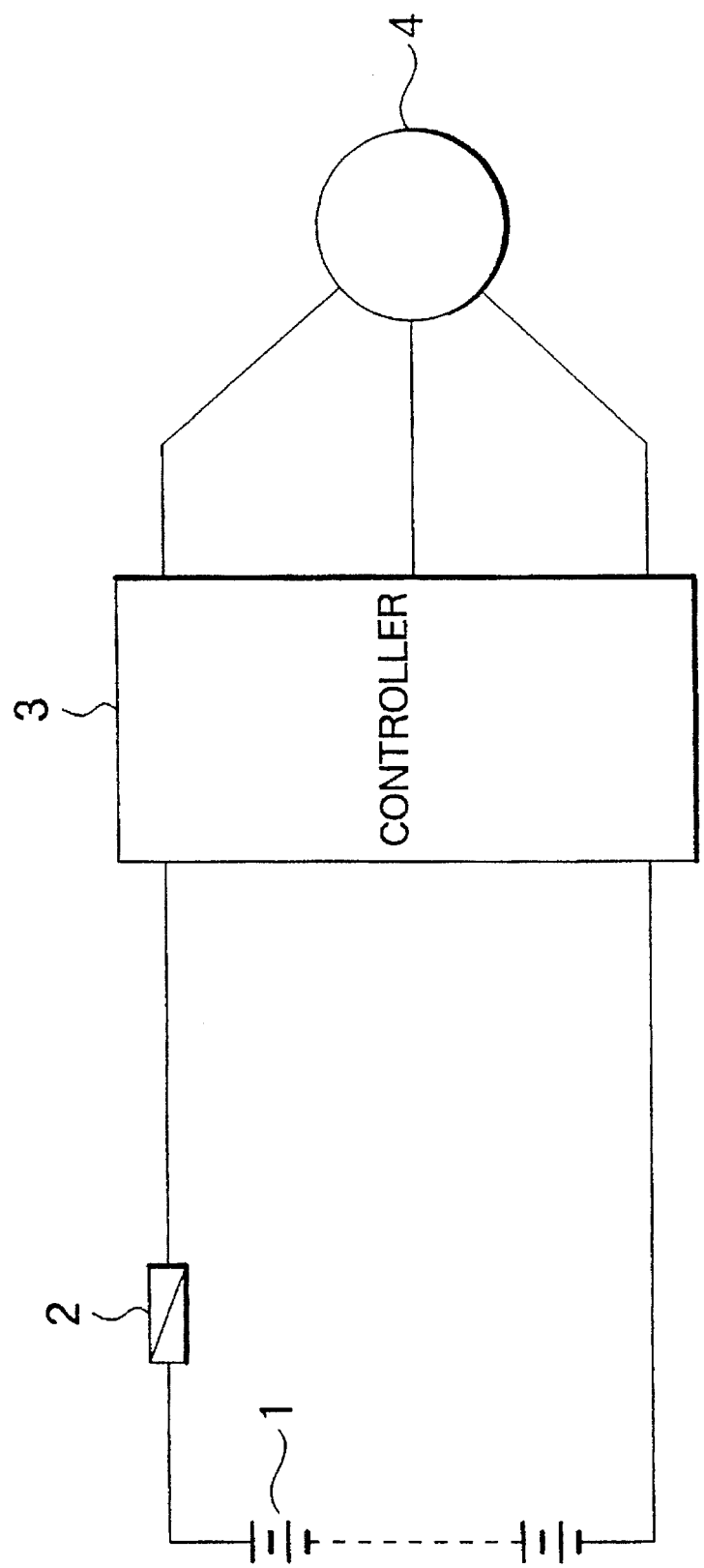
FIG. 4 is a diagram of the configuration of a conventional vehicle safety device.

FIG. 1 is a block diagram of a power circuit of an electric propulsion system in which the present invention is applied to an electric vehicle. In FIG. 1, components corresponding to those shown in FIG. 4 are indicated by the same reference characters. The corresponding components will not be described particularly.

As shown in FIG. 1, a breaker 5 serving as a current path cutting means is connected in the current path between a fuse 2 and a controller 3. Opening and closing of the breaker 5 are controlled by a distance measuring unit 7 which detects a collision between the vehicle and an object 6. The breaker 5 is opened in a situation where a collision is detected by the distance measuring unit 7.

The distance measuring unit 7 has a laser light emitting section 8, a laser light receiving section 9 and a processing section 10. An emission control signal is supplied from the processing section 10 to the laser light emitting section 8, while an output signal from the laser light receiving section 9 is supplied to the processing section 10. In the processing section 10 calculates the time difference between the time when the laser light emitting section 8 emits light and the time when the laser light receiving section 9 thereafter receives light, the distance between the vehicle and the object 6 against which the vehicle may collide, and the relative speed between the vehicle and the object.

If the distance between the vehicle and the object 6 becomes zero while the relative speed between the vehicle and the object 6 is equal to or larger than a certain value, the processing section 10 determines that a collision has occurred, and supplies a control signal to the breaker 5 to open it.

In the above-described system, in a normal state, a current supplied from a battery 1 flows through the fuse 2 and the breaker 5 into the controller 3. The current, having been controlled by the controller 3, flows into an alternating current motor 4 to generate a driving force in it. A drive mechanism of the vehicle is driven by the driving force of the alternating current motor 4.

The laser light emitting section 8 of the distance measuring unit 7 emits toward the object 6 laser light which is reflected by the object 6 and received by the laser light receiving section 9. The processing section 10 detects the time difference between the moment at which the laser light emitting section 8 emits the laser light and the moment at which the laser light receiving section 9 receives the reflected laser light. The processing section 10 calculates the distance between the vehicle and the object 6 by multiplying this time difference by a constant, and calculates the closing speed between the vehicle and the object 6 from a change in the calculated distance with respect to time.

When the vehicle collides against the object 6, the distance between the vehicle and the object 6 becomes zero while the relative speed between the vehicle and the object 6 is larger than a certain value. Therefore, the processing section 10 detects the occurrence of the collision and supplies the control signal to it. The current path between the battery 1 and the controller 3 is thereby interrupted to stop the current supply from the battery 1 to the controller 3 and the alternating current motor 4. The vehicle is thereby stopped. In this manner, uncontrolled travel or runaway of the vehicle is prevented.

Figure 2:
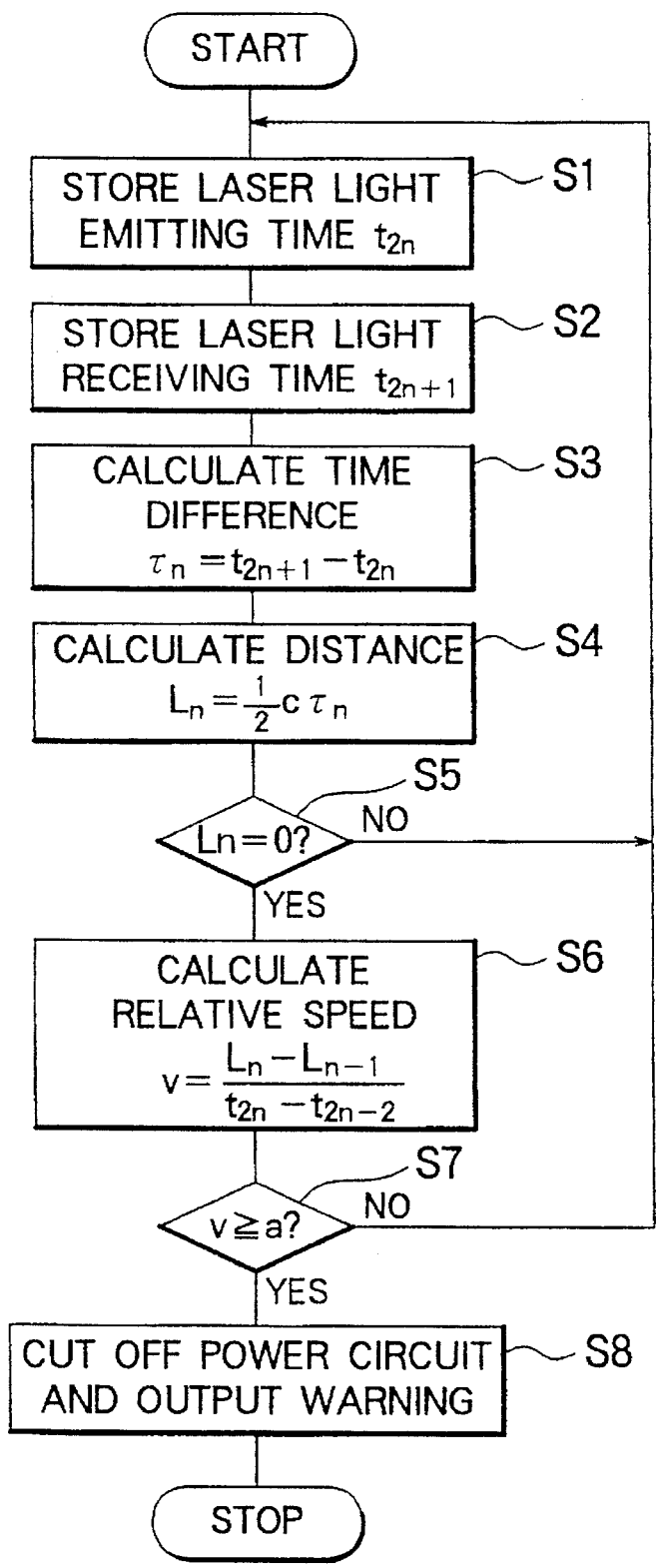
FIG. 2 is a flowchart of the operation of essential portions of the invention.

The operation of the processing section 10 will be described in detail with reference to FIG. 2.

In step S1, a time $t_{2n}$ when the laser light emitting section 8 emits laser light is stored. In step S2, a time $t_{2n+1}$ when the reflected laser light from the object 6 is received is stored.

In step S3, the time difference $\tau_n$ between the light emitting time and the light receiving time is calculated on the basis of the stored information by the following equation:

$$\tau_n = t_{2n+1} - t_{2n} \qquad (1)$$

Then, in step S4, the distance between the vehicle and the object 6 is calculated on the basis of the time difference obtained in step S3 by the following equation:

$$L_n = (C \cdot \tau_n)/2 \qquad (2)$$

In step S5, a determination is made as to whether the distance $L_n$ is 0. If NO, the process returns to step S1 to repeat the above-mentioned operations. If the distance $L_n$ becomes 0, the process advances to step S6 to calculate the relative speed v between the vehicle and the object 6 when the distance $L_n$ becomes 0 by the following equation:

$$v = (L_n - L_{n-1})/(t_{2n} - t_{2n-2}) \qquad (3)$$

Thereafter, in step S7, a determination is made as to whether the relative speed v obtained in step S6 is equal to or higher than a certain speed a. If the relative speed v is lower than the speed a, the process returns to step S1 to repeat the above-mentioned operations. If the relative speed v is equal to or higher than the speed a, the process advances to step S8.

The determination of step S7 is provided for a reason described below. The contact between the vehicle and the object 6 with the distance $L_n$ reduced to 0 does not always mean the occurrence of a collision accident. For example, it may also mean a situation where the vehicle is pushing another vehicle or the object 6 in front. Step S7 is provided to avoid mistaking such a situation for a collision. In step S7 the occurrence of a collision is determined if the relative speed v is equal to or higher than a certain speed, for example, 10 to 20 km/h, and it is possible to determine that, under the condition that the relative speed is lower than the certain speed, a situation where the distance $L_n$ is 0, that is, the vehicle and the object 6 are in contact with each other, does not mean occurrence of a collision.

Thus, if the relative speed v is equal to or higher than the certain speed a in step S7, the occurrence of a collision is determined. Then, in step S8, the processing section 10 supplies the control signal to the breaker 5 to open it. The current path between the battery 1 and the controller 3, i.e., the power circuit is thereby cut off and warning is effected.

EMBODIMENT 2

Figure 3:
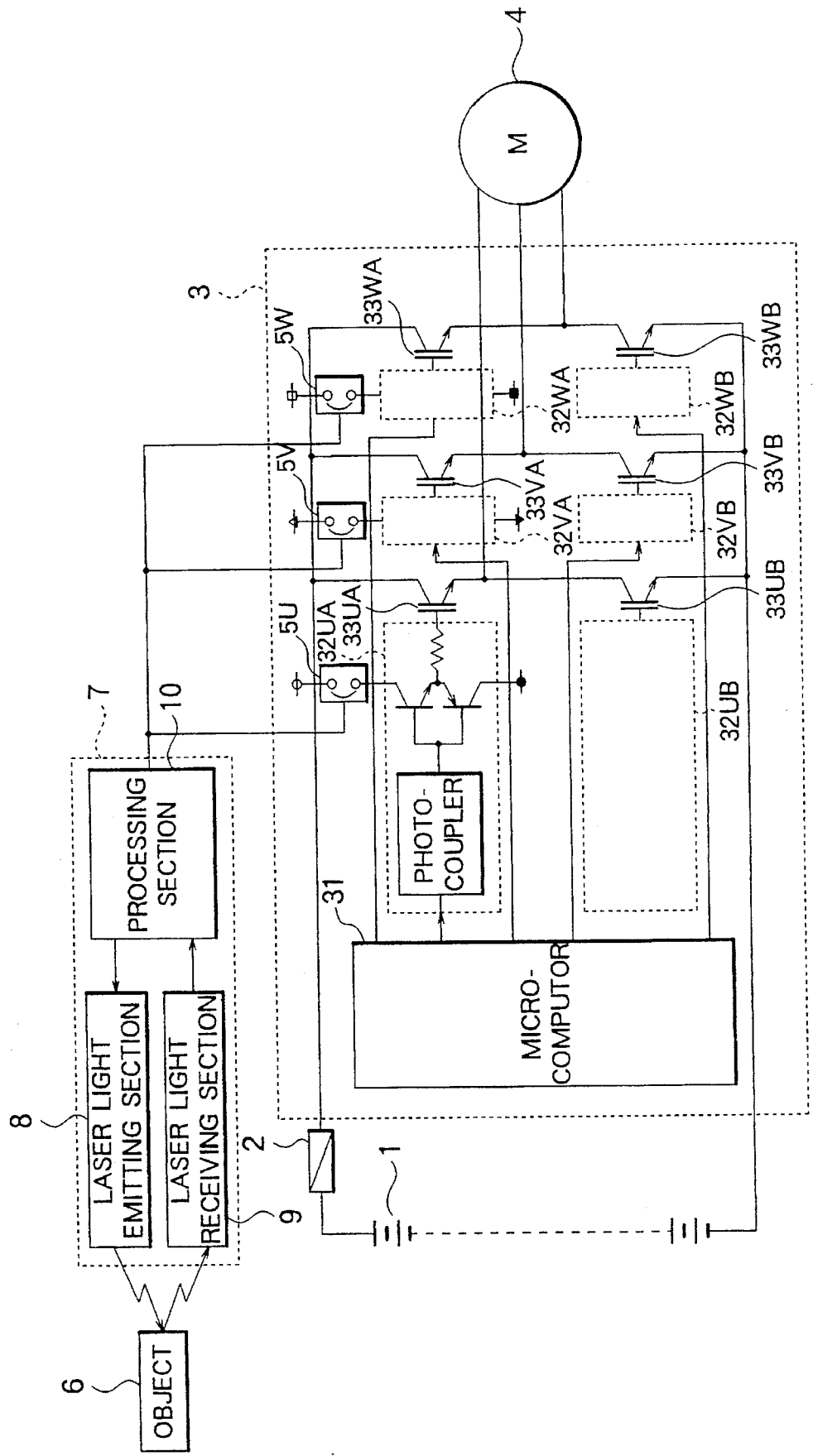
FIG. 3 is a diagram of the configuration of another embodiment of a vehicle safety device in accordance with the present invention.

The embodiment of the safety device has been described with respect to use in a power circuit of an electric vehicle. However, a safety device may be arranged in any other electric circuit of the electric vehicle in accordance with the present invention. FIG. 3 shows an example of such a safety device.

As shown in FIG. 3, a controller 3 has a microcomputer 31, a plurality of pairs of switching power sources 32UA and 32UB, 32VA and 32VB, and 32WA and 32WB provided one for each phase, and a plurality of pairs of switching devices 33UA and 33UB, 33VA and 33VB, and 33WA and 33WB respectively connected to the corresponding pairs of switching power sources. A common connection point between the pair of switching devices for each phase is connected to an alternating current motor 4.

In this embodiment, breakers 5U, 5V and 5W are respectively connected between the switching power sources 32A, 32VA and 32WA operating in the respective phases and power source terminals to which a predetermined voltage is applied. The breakers 5U, 5V and 5W are controlled by a processing section 10. At the time of occurrence of a collision accident, a control signal is supplied from the processing section 10 to each of the breakers 5U, 5V and 5W to open them. The switching power source of each phase is thereby deenergized so that the corresponding switching device is turned off, thereby inhibiting currents from flowing from the battery 1 to the alternating current motor 4.

Thus, this embodiment has the same effect as that of the above-described first embodiment. Further, each breaker used in this embodiment may be a small capacity breaker.

EMBODIMENT 3

In the above-described embodiments, the distance and the relative speed between the vehicle and the object 6 are measured by using laser light. Alternatively, they may be obtained by image processing. That may be, the distance to the object 6 may be obtained by imaging a contour of the object 6 and the relative speed is calculated from the distance. The distance and the relative speed may also be obtained by using ultrasonic waves or the like.

EMBODIMENT 4

In the above-described embodiments, breakers 5 are used as a means for cutting off the power circuit of the vehicle. However, any other switching device, for example, an electromagnetic contact device may also be used, which is advantageous in that the electromagnetic contact device can be operably controlled with the accelerator of the vehicle so as to be reset in response to an operation of the accelerator.

EMBODIMENT 5

In the above-described embodiments, the distance measuring unit 7 is connected only to the breaker 5. However, the distance measuring unit 7 may be arranged such that it can also be connected to a vehicle-to-vehicle distance detecting and warning device, a vehicle-to-vehicle distance detecting and braking device, a follow-up traveling device or the like for common use therewith.

EMBODIMENT 6

In the above-described embodiments, the relative speed between the vehicle and the object 6 is calculated from a change in the calculated distance with respect to time, and the occurrence of a vehicle collision is detected on the basis of the distance and the relative speed. However, the arrangement may alternatively be such that occurrence of a vehicle collision is detected on the basis of the distance and the absolute speed of the vehicle detected with a vehicle speed sensor.

Examples of the application of the present invention to an electric vehicle have been described as embodiments of the invention. However, the present invention is not limited to the described embodiments and can be applied to any other kinds of vehicles in which a driving force is transmitted from a power unit to road wheels through a power transmission path. Also, the safety device may alternatively be arranged so that a direct current motor is used instead of the alternating current motor.

What is claimed is:

1. A safety device for preventing the uncontrolled travel or runaway of an operator driven electric road vehicle following a collision, said vehicle including an electric motor powered by an electric power source, a drive unit connected with said electric motor for driving road wheels, and a controller for controlling a current supplied from said electric power source to said electric motor to thereby regulate a driving force of said electric motor, said safety device comprising:

a) collision detecting means for detecting a collision of the road vehicle with an object and generating a corresponding output signal; and b) current path interrupting means operatively connected in a current path between said electric power source and said controller for interrupting said current path in response to the output signal from said collision detecting means.

2. A safety device according to claim 1, wherein the collision detecting means comprises distance detecting means for detecting a distance from the vehicle to said object, said collision detecting means being operable to detect the collision of the vehicle with said object when the detected distance becomes zero.

3. A safety device according to claim 1, wherein the collision detecting means comprises distance detecting means for detecting a distance from the vehicle to said object and a relative speed between the vehicle and said object, said distance detecting means being operable to detect a vehicle collision when the detected distance becomes zero and the relative speed between the vehicle and said object is equal to or larger than a predetermined value.

* * * * *